(12) United States Patent
Ackelid

(10) Patent No.: US 10,792,757 B2
(45) Date of Patent: Oct. 6, 2020

(54) METHOD AND APPARATUS FOR ADDITIVE MANUFACTURING

(71) Applicant: Arcam AB, Moelndal (SE)

(72) Inventor: Ulf Ackelid, Goeteborg (SE)

(73) Assignee: Arcam AB, Moelndal (SE)

(*) Notice: Subject to any disclaimer, the term of this patent is extended or adjusted under 35 U.S.C. 154(b) by 511 days.

(21) Appl. No.: 15/702,445

(22) Filed: Sep. 12, 2017

(65) Prior Publication Data

US 2018/0111219 A1 Apr. 26, 2018

Related U.S. Application Data

(60) Provisional application No. 62/412,497, filed on Oct. 25, 2016.

(51) Int. Cl.
| | |
|---|---|
| *B33Y 10/00* | (2015.01) |
| *B33Y 30/00* | (2015.01) |
| *B23K 15/00* | (2006.01) |
| *B22F 3/105* | (2006.01) |
| *B33Y 50/02* | (2015.01) |

(52) U.S. Cl.
CPC ........ *B23K 15/0086* (2013.01); *B22F 3/1055* (2013.01); *B23K 15/0006* (2013.01); *B23K 15/0013* (2013.01); *B23K 15/0093* (2013.01); *B33Y 10/00* (2014.12); *B33Y 30/00* (2014.12);
(Continued)

(58) Field of Classification Search
CPC ............ B23K 15/0086; B23K 15/0093; B23K 26/34–342; B33Y 10/00; B33Y 30/00
See application file for complete search history.

(56) References Cited

U.S. PATENT DOCUMENTS

| | | | |
|---|---|---|---|
| 2,264,968 A | 12/1941 | De Forest | |
| 2,323,715 A | 7/1943 | Kuehni | |

(Continued)

FOREIGN PATENT DOCUMENTS

| | | |
|---|---|---|
| CA | 2860188 A1 | 6/2006 |
| CN | 101607311 A | 12/2009 |

(Continued)

OTHER PUBLICATIONS

International Search Report relating to PCT/EP2016/076831 filed Oct. 20, 2017; dated Mar. 29, 2018.
(Continued)

*Primary Examiner* — Michael A Laflame, Jr.
(74) *Attorney, Agent, or Firm* — Dinsmore & Shohl LLP

(57) ABSTRACT

A method for forming at least one three-dimensional article through successive fusion of parts of a powder bed, the method comprising the steps of: providing a model of the at least one three dimensional article; applying a first powder layer on at least one build platform; directing an electron beam from an inclined electron beam source over the at least one build platform where a central electron beam emanating from the source is building an angle α with respect to a normal to the build platform≠0°, the directing of the first energy beam causing the first powder layer to fuse in a first selected locations according to the model; rotating or tilting the electron beam source a predetermined angle, directing the electron beam from the tilted or rotated electron beam source causing a first powder layer to fuse in a second selected locations according to the model.

14 Claims, 9 Drawing Sheets

(52) U.S. Cl.
CPC ....... *B33Y 50/02* (2014.12); *B22F 2003/1057* (2013.01); *Y02P 10/295* (2015.11)

(56) References Cited

U.S. PATENT DOCUMENTS

| | | | |
|---|---|---|---|
| 3,634,644 A | 1/1972 | Ogden et al. |
| 3,838,496 A | 10/1974 | Kelly |
| 3,882,477 A | 5/1975 | Mueller |
| 3,906,229 A | 9/1975 | Demeester et al. |
| 3,908,124 A | 9/1975 | Rose |
| 4,314,134 A | 2/1982 | Schumacher et al. |
| 4,348,576 A | 9/1982 | Anderl et al. |
| 4,352,565 A | 10/1982 | Rowe et al. |
| 4,401,719 A | 8/1983 | Kobayashi et al. |
| 4,541,055 A | 9/1985 | Wolfe et al. |
| 4,651,002 A | 3/1987 | Anno |
| 4,818,562 A | 4/1989 | Arcella et al. |
| 4,863,538 A | 9/1989 | Deckard |
| 4,888,490 A | 12/1989 | Bass et al. |
| 4,927,992 A | 5/1990 | Whitlow et al. |
| 4,958,431 A | 9/1990 | Clark et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,508,489 A | 4/1996 | Benda et al. |
| 5,511,103 A | 4/1996 | Hasegawa |
| 5,595,670 A | 1/1997 | Mombo-Caristan |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,204,469 B1 | 3/2001 | Fields et al. |
| 6,419,203 B1 | 7/2002 | Dang |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,454,262 B2 | 11/2008 | Larsson et al. |
| 7,537,722 B2 | 5/2009 | Andersson et al. |
| 7,540,738 B2 | 6/2009 | Larsson et al. |
| 7,569,174 B2 | 8/2009 | Ruatta et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,137,739 B2 | 3/2012 | Philippi et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,254,535 B2 | 2/2016 | Buller et al. |
| 9,310,188 B2 | 4/2016 | Snis |
| 9,505,172 B2 | 11/2016 | Ljungblad |
| 9,550,207 B2 | 1/2017 | Ackelid |
| 9,802,253 B2 | 10/2017 | Jonasson |
| 9,950,367 B2 | 4/2018 | Backlund et al. |
| 10,071,422 B2 | 9/2018 | Buller et al. |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0204765 A1 | 10/2004 | Fenning et al. |
| 2004/0217095 A1 | 11/2004 | Herzog |
| 2005/0173380 A1 | 8/2005 | Carbone |
| 2005/0186538 A1 | 8/2005 | Uckelmann |
| 2005/0282300 A1 | 12/2005 | Yun et al. |
| 2006/0108712 A1 | 5/2006 | Mattes |
| 2006/0138325 A1 | 6/2006 | Choi |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0074659 A1 | 4/2007 | Wahlstrom |
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1 | 12/2007 | Perret et al. |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2009/0206056 A1 | 8/2009 | Xu et al. |
| 2010/0007062 A1 | 1/2010 | Larsson et al. |
| 2010/0260410 A1 | 10/2010 | Taminger et al. |
| 2010/0305743 A1 | 12/2010 | Larsson |
| 2010/0310404 A1 | 12/2010 | Ackelid |
| 2010/0316856 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |
| 2011/0240607 A1 | 10/2011 | Stecker et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet et al. |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ackelid |
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1 | 10/2013 | Green |
| 2013/0278920 A1 | 10/2013 | Loewgren |
| 2013/0300286 A1 | 11/2013 | Ljungblad et al. |
| 2013/0343947 A1 | 12/2013 | Satzger et al. |

(56) References Cited

U.S. PATENT DOCUMENTS

| | | |
|---|---|---|
| 2014/0175708 A1 | 6/2014 | Echigo et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0130118 A1 | 5/2015 | Cheng et al. |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1 | 8/2016 | Ashton et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2018/0009033 A1 | 1/2018 | Fager |
| 2018/0154443 A1* | 6/2018 | Milshtein ............ B23K 15/0086 |
| 2018/0154444 A1 | 6/2018 | Jonasson |
| 2018/0369960 A1* | 12/2018 | Ishikawa ............ B23K 26/0006 |

FOREIGN PATENT DOCUMENTS

| | | |
|---|---|---|
| CN | 101635210 A | 1/2010 |
| CN | 201693176 U | 1/2011 |
| CN | 101607311 B | 9/2011 |
| CN | 203509463 U | 4/2014 |
| DE | 19952998 A1 | 5/2001 |
| DE | 20305843 U1 | 7/2003 |
| DE | 10235434 A1 | 2/2004 |
| DE | 102005014483 A1 | 10/2006 |
| DE | 202008005417 U1 | 8/2008 |
| DE | 102007018601 A1 | 10/2008 |
| DE | 102007029052 A1 | 1/2009 |
| DE | 102008012064 A1 | 9/2009 |
| DE | 102010041284 A1 | 3/2012 |
| DE | 102010046467 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| EP | 2289652 A1 | 3/2011 |
| EP | 2292357 A1 | 3/2011 |
| EP | 2832474 A1 | 2/2015 |
| EP | 3031552 A2 | 10/2015 |
| FR | 2980380 A1 | 3/2013 |
| JP | H05-171423 A | 7/1993 |
| JP | 2003241394 A | 8/2003 |
| JP | 2003245981 | 9/2003 |
| JP | 2009006509 A | 1/2009 |
| SE | 524467 C2 | 8/2004 |
| WO | WO 1993/08928 A1 | 5/1993 |
| WO | WO 1996/012607 A1 | 5/1996 |
| WO | WO 1997/37523 A2 | 10/1997 |
| WO | WO 2001/081031 A1 | 11/2001 |
| WO | WO 2001/85386 A2 | 11/2001 |
| WO | WO 2002/008653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2004/106041 A2 | 12/2004 |
| WO | WO 2004/108398 A1 | 12/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/074287 A1 | 6/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/092997 A1 | 6/2013 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/071968 A1 | 5/2014 |
| WO | WO 2014/092651 A1 | 6/2014 |
| WO | WO 2014/095200 A1 | 6/2014 |
| WO | WO 2014/095208 A1 | 6/2014 |
| WO | WO 2014/195068 A1 | 12/2014 |

(56) References Cited

FOREIGN PATENT DOCUMENTS

| WO | WO 2015/032590 A2 | 3/2015 |
|---|---|---|
| WO | WO 2015/091813 A1 | 6/2015 |
| WO | WO 2015/120168 A1 | 8/2015 |
| WO | WO 2015/142492 A1 | 9/2015 |

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

Gibson, D.W., et al., "Additive Manufacturing Technologies: Rapid Prototyping to Direct Digital Manufacturing", 2010, pp. 126-129, Springer, New York.

Guibas, Leonidas J., et al., "Randomized Incremental Construction Of Delaunay And Voronoi Diagrams", Algorithmica, Jun. 1992, pp. 381-413, vol. 7, Issue 1-6, Springer-Verlag, New York.

Klassen, Alexander, et al., "Modelling f Electron Beam Absorption in Complex Geometries", *Journal Of Physics D: Applied Physics*, Jan. 15, 2014, 12 pages, vol. 47, No. 6, Institute Of Physics Publishing Ltd., Great Britain.

Motojima, Seiji, et al., "Chemical Vapor Growth Of LaB6 Whiskers And Crystals Having A Sharp Tip", Journal Of Crystal Growth, vol. 44, No. 1, Aug. 1, 1978 (Aug. 1, 1978), pp. 106-109.

Weigel, TH., et al., "Design And Preparation Of Polymeric Scaffolds For Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

European Office Action for application 17787179.5 dated Apr. 9, 2020 (7 pages).

\* cited by examiner

METHOD AND APPARATUS FOR ADDITIVE MANUFACTURING

CROSS-REFERENCE TO RELATED APPLICATIONS

This application claims priority to and the benefit of U.S. Provisional Patent Application Ser. No. 62/412,497, filed Oct. 25, 2016, the contents of which as are hereby incorporated by reference in their entirety.

BACKGROUND

Technical Field

The present invention relates to a method and apparatus for additive manufacturing of three-dimensional articles.

Description of Related Art

Freeform fabrication or additive manufacturing is a method for forming three-dimensional articles through successive fusion of chosen parts of powder layers applied to a build platform. A method and apparatus according to this technique is disclosed in US 2009/0152771.

Such an apparatus may comprise a build platform on which the three-dimensional article is to be formed, a powder dispenser, arranged to lay down a thin layer of powder on the build platform for the formation of a powder bed, a ray gun for delivering energy to the powder whereby fusion of the powder takes place, elements for control of the ray given off by the ray gun over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

Thus, there is a demand for additive manufacturing techniques which are capable of building larger and larger three-dimensional articles. Increasing the build volume also requires higher beam power of the beam power source and/or higher deflection angles of the beam source which may lead to process difficulties in order to keep the beam spot quality equal over the entire build area.

BRIEF SUMMARY

An object of the invention is to provide methods and apparatuses which enable large build volumes of a three-dimensional articles produced by freeform fabrication or additive manufacturing without sacrificing the quality of the energy beam spot.

In a first aspect of the invention it is provided a method for increasing the build area when forming at least one three-dimensional article through successive fusion of parts of a powder bed, which parts correspond to successive cross sections of the at least one three-dimensional article. The method comprises the steps of: providing a model of the at least one three dimensional article; applying a first powder layer on at least one build platform; directing a deflectable electron beam from an electron beam source arranged in a first position over the at least one build platform, the directing of the electron beam causing the first powder layer to fuse in a first selected locations according to the model, so as to form a first part of a first cross section of the three-dimensional article; rotating or tilting the electron beam source a predetermined angle to a second position and/or laterally moving the electron beam source a predetermined distance over the build area to a second position; and directing the deflectable electron beam from the electron beam source in the second position over the at least one build platform, the directing of the electron beam causing a first powder layer to fuse in a second selected locations according to the model, so as to form a second part of a first cross section of a three-dimensional article, wherein the first and second selected locations are provided on a first and second build platform respectively An exemplary advantage of various embodiments of the present invention is that the build area may be increased for a given electron beam source.

In an example embodiment of the present invention a central non-deflected electron beam emanating from the electron beam source is building an angle $\alpha$ with respect to a normal to the build platform$\neq 0°$. An exemplary advantage of at least this embodiment is that beams from the tilted electron beam source may easier be kept away from internal equipment inside the build chamber compared to a non-tilted electron beam source which is to be rotated or tilted between at least a first and second position.

In another example embodiment of the present invention the at least one three-dimensional article on the first build platform is finished before forming the at least one three-dimensional article on the second build platform.

Another non-limiting advantage of at least this embodiment is that the electron beam source need only to change its position once, i.e., after having finished the three dimensional article on a first build platform the electron beam source is changing its position in order to be able to melt powder particles on the second build platform.

In another example embodiment of the present invention the at least one three-dimensional article on the first build platform is formed in parallel with the at least one three-dimensional article on the second build platform.

Another non-limiting advantage of at least this embodiment is that it may reduce to total time of manufacturing three dimensional articles on the first and the second build platform since while distribution a new powder layer on a first build platform fusion may take place on a second build platform.

In still another example embodiment of the present invention the first and second locations are provided on a single build platform. A non-limiting advantage of at least this example embodiment is that larger three dimensional articles may be built with a single electron beam source without sacrificing the accuracy of the finished three-dimensional article.

In still another example embodiment of the present invention a central non-deflected electron beam emanating from the electron beam source is provided off-centre on the build platform. A non-limiting advantage of at least this example embodiment is that an off-centre distance may be varied for adapting to different sizes of building areas for the electron beam source.

In yet another example embodiment of the present invention the first and second selected locations are partially overlapping each other in a first overlapping zone. A non-limiting advantage of at least this example embodiment is that a smooth transition of the melting of the powder material by the electron beam being positioned in the first and second positon may be achieved.

In still another example embodiment of the present invention the first and second selected locations are non-overlapping with each other. A non-limiting advantage of at least this example embodiment is that it suits well for multiple three-dimensional article built where none of the need to be manufactured by using the electron beam source in both positions.

In still another example embodiment of the present invention the predetermined rotating angle is 90° or 180°. A non-limiting advantage of at least this example embodiment is that many different rotating angles may be used depending inter alia on the tilting angle of the electron beam source (the angle of the non-deflected electron beam in relation to a normal of the build platform), the area coverage of the electron beam source on the build platform and the offset of an non-deflected electron beam in relation to the center position of the build platform.

In still another example embodiment of the present invention the predetermined tilting angle is an opposite angle to a. A non-limiting advantage of at least this example embodiment is that by using an opposite angle $\alpha$ symmetry is achieved. Obviously any angle may be used which is moving the non-deflected electron beam to desired area of powder material to fuse.

In still another example embodiment of the present invention the method further comprising the step of: applying a second powder layer on top of the partially fused first powder layer; directing the deflectable electron beam from the electron beam source arranged in a third position over the build platform causing the second powder layer to fuse in a third selected locations according to the model to form a first part of a second cross section of the at least one three-dimensional article; rotating or tilting the electron beam source a predetermined angle to a fourth position and/or laterally moving the electron beam source a predetermined distance over the build area to a fourth position; and directing the deflectable electron beam from the electron beam source in the fourth position over the at least one build platform, the directing of the electron beam causing a second powder layer to fuse in a fourth selected locations according to the model, so as to form a second part of a second cross section of a three-dimensional article, wherein the first and second selected locations of the first cross section is at least partially refused when fusing the third and fourth selected locations respectively.

A non-limiting advantage of at least this example embodiment is that at least a first layer of the three-dimensional article may be built with the electron beam source positioned in different positions with respect to a second layer of the three-dimensional article.

In still another example embodiment of the present invention the first overlapping zone is laterally shifted from one cross section to another. A non-limiting advantage of at least this example embodiment is that any overlapping zone may be hidden by distributing it over the build area.

In another aspect of the present invention it is provided an apparatus for forming at least one three-dimensional article through successive fusion of parts of a powder bed, which parts corresponds to successive cross sections of the at least one three-dimensional article, the apparatus comprising: a computer model of the at least one three-dimensional article; means for applying a first powder layer on at least one build platform; an electron beam source emitting a deflectable electron beam causing a first powder layer to fuse in first selected locations according to the model to form a first part of a first cross section of the at least one three-dimensional article; at least one of a rotating support, a tiltable support and/or a slidable support to which the electron beam source is attached; and at least one control unit adapted for controlling at least one of rotation angle, tilting angle and/or movable distance of the support and for storing the computer model and controlling the electron beam source. A non-limiting advantage of at least this example embodiment is that such an apparatus large articles with controlled quality may be produced.

In another example embodiment of the present invention the electron beam source is adapted to be rotated, tilted and/or moved between a first and second position so that when the electron beam source is arranged in the first position the electron beam is forming three-dimensional articles on a first build platform and when the electron beam source is arranged in the second position the electron beam is forming three-dimensional articles on a second build platform. A non-limiting advantage of at least this example embodiment is that such apparatus may build more articles in a single build compared to a fixed single electron beam source.

In still another example embodiment of the present invention there is provided an apparatus for forming at least one three-dimensional article through successive fusion of parts of a powder bed, which parts corresponds to successive cross sections of the at least one three-dimensional article, the apparatus comprising: one or more memory storage areas containing a computer model of the at least one three-dimensional article; means for applying a first powder layer on at least one build platform; an electron beam source emitting a deflectable electron beam causing a first powder layer to fuse in first selected locations according to the model to form a first part of a first cross section of the at least one three-dimensional article; at least one of a rotating support, a tiltable support, or a slidable support to which the electron beam source is attached; and at least one control unit configured for, via one or more computer processors, controlling at least one of a rotation angle, a tilting angle or a movable distance of the support and for storing the computer model and controlling the electron beam source.

In still yet another example embodiment of the present invention there is provided a computer-implemented method for increasing the build area when forming at least one three-dimensional article through successive fusion of parts of a powder bed, which parts correspond to successive cross sections of the at least one three-dimensional article, the method comprising the steps of: providing in one or more memory storage areas a model of the at least one three dimensional article; and via one or more computer processors: applying a first powder layer on at least one build platform; directing a deflectable electron beam from an electron beam source arranged in a first position over the at least one build platform, the directing of the electron beam causing the first powder layer to fuse in a first selected locations according to the model, so as to form a first part of a first cross section of the three-dimensional article; at least one of rotating or tilting the electron beam source a predetermined angle to a second position or laterally moving the electron beam source a predetermined distance over the build area to a second position; and directing the deflectable electron beam from the electron beam source in the second position over the at least one build platform, the directing of the electron beam causing a first powder layer to fuse in a second selected locations according to the model, so as to form a second part of a first cross section of a three-dimensional article, wherein the first and second selected locations are provided on a first and second build platform respectively.

In still another example embodiment of the present invention there is provided a computer program product comprising at least one non-transitory computer-readable storage medium having computer-readable program code portions embodied therein, the computer-readable program code portions comprising at least one executable portion configured for: directing a deflectable electron beam from an electron beam source arranged in a first position over the at least one build platform, the directing of the electron beam causing a first powder layer applied to at least one build platform to fuse in a first selected locations according to a model of the at least one three dimensional article, so as to form a first part of a first cross section of the three-dimensional article; at least one of rotating or tilting the electron beam source a predetermined angle to a second position or laterally moving the electron beam source a predetermined distance over the build area to a second position; and directing the deflectable electron beam from the electron beam source in the second position over the at least one build platform, the directing of the electron beam causing a first powder layer to fuse in a second selected locations according to the model, so as to form a second part of a first cross section of a three-dimensional article, wherein the first and second selected locations are provided on a first and second build platform respectively.

BRIEF DESCRIPTION OF SEVERAL VIEWS OF THE DRAWINGS

Various embodiments of the invention will be further described in the following, in a non-limiting way with reference to the accompanying drawings. Same characters of reference are employed to indicate corresponding similar parts throughout the several figures of the drawing.

DETAILED DESCRIPTION OF VARIOUS EMBODIMENTS

To facilitate the understanding of various embodiments of the present invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 3A:
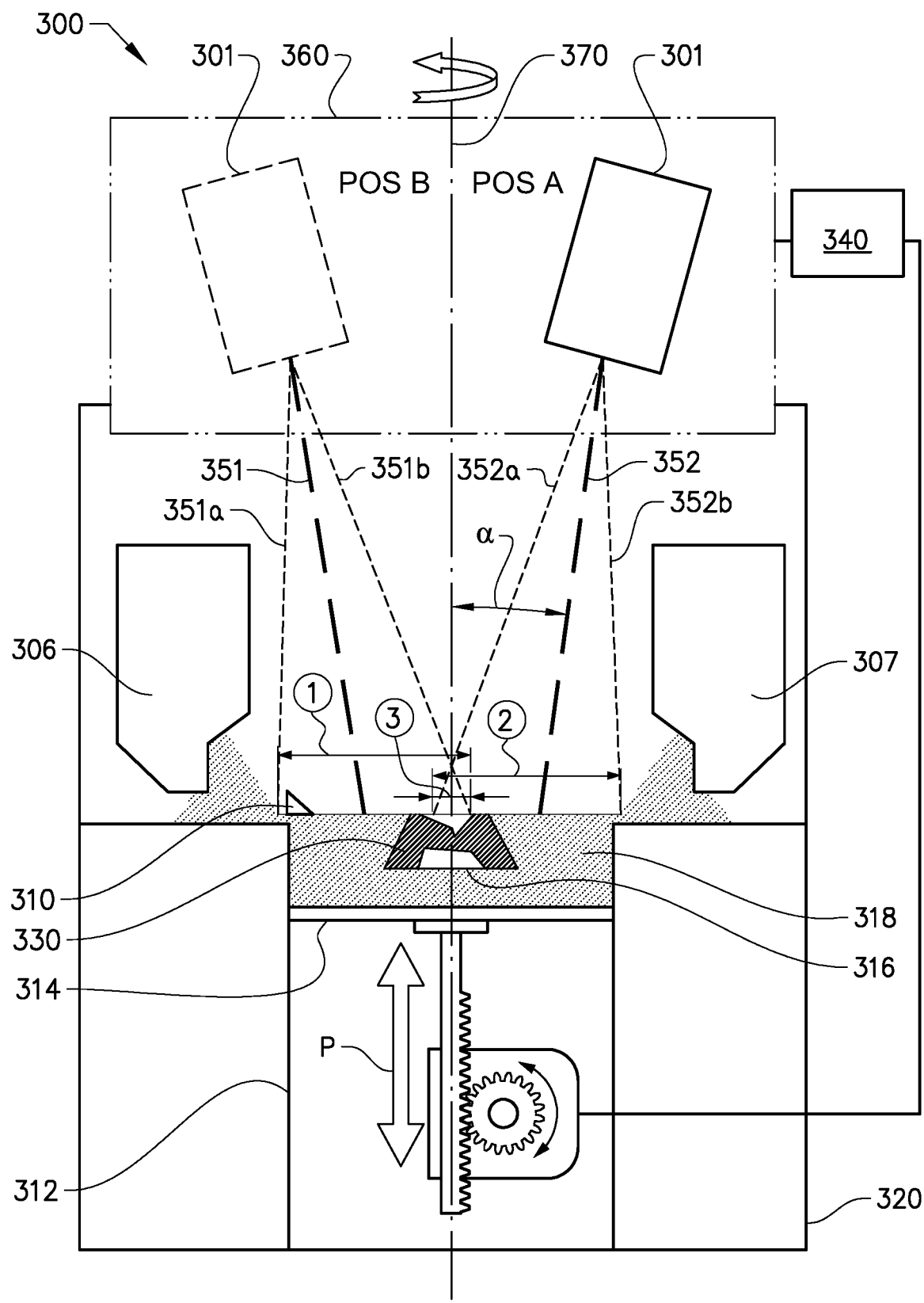
FIG. 3A depicts an apparatus according to a first example embodiment of the present invention.

FIG. 3A depicts a first example embodiment of a freeform fabrication or additive manufacturing apparatus 300 according to the present invention. The apparatus 300 comprises an electron gun 301; two powder hoppers 306, 307; a start plate 316; a build tank 312; a powder distributor 310; a build platform 314; a vacuum chamber 320 and a control unit 340. FIG. 3A discloses only one beam source for sake of simplicity. Of course, any number of beam sources can be used in a similar manner as the single beam source which is used for describing the invention. It is obvious for the skilled person when having seen the inventive concept as disclosed herein using only one beam source and apply it for any specific number that might suit his or her purpose.

The vacuum chamber 320 is capable of maintaining a vacuum environment by means of a vacuum system, which system may comprise a turbomolecular pump, a scroll pump, an ion pump and one or more valves which are well known to a skilled person in the art and therefore need no further explanation in this context. The vacuum system is controlled by the control unit 340.

The electron gun 301 is generating electron beams, which are used for melting or fusing together powder material 318 provided on the start plate 316. The control unit 340 may be used for controlling and managing the electron beams emitted from the electron beam gun 301.

In a first example embodiment, as depicted in FIG. 3A, the electron beam source 301 is attached to a rotating support 360. The rotating support 360 may be connectable and sealable to the vacuum chamber 320. The rotation of the support 360 may be accomplished with an external motor (not shown) and the support 360 may be rotating around a central axis 370. The electron beam source 301 is attached to the support so that a central non-deflected beam 351, 352, from the electron beam source 301 is building an angle α with the central axis and normal 370 to the build platform 314.

The electron beam source 301 may be emitting a first electron beam 351 when arranged in position B and a second electron beam 352 when arranged in position A. The first electron beam 351 may be deflected between at least a first extreme position 351a and at least a second extreme position 351b defining a first selected area 1. The second electron beam 352 may be deflected between at least a first extreme position 352a and at least a second extreme position 352b defining a second selected area 2. At least one of the first or second extreme positions 351a, 351b of the first electron beam 351 when the electron beam source 301 is arranged in position B may be overlapping one of the at least first or second extreme positions 352a, 352b of the second electron beam 352 when the electron beam source 301 is arranged in position A, and thereby creating an overlap region 3.

The angle α may be any angle between 5-45°. In FIG. 3A the support is rotated 180° for moving the electron beam source from position A to position B.

In FIG. 3A the central non-deflected beam 351, 352 impinge off-center of the latest applied powder layer on the build platform 314.

In an alternative embodiment (not shown) the central non-deflected beam 351, 352 impinge off-center of the latest applied powder layer on the build platform just as depicted in FIG. 3A, but the beam is parallel with the central axis and normal 370 to the build platform.

Figure 3B:
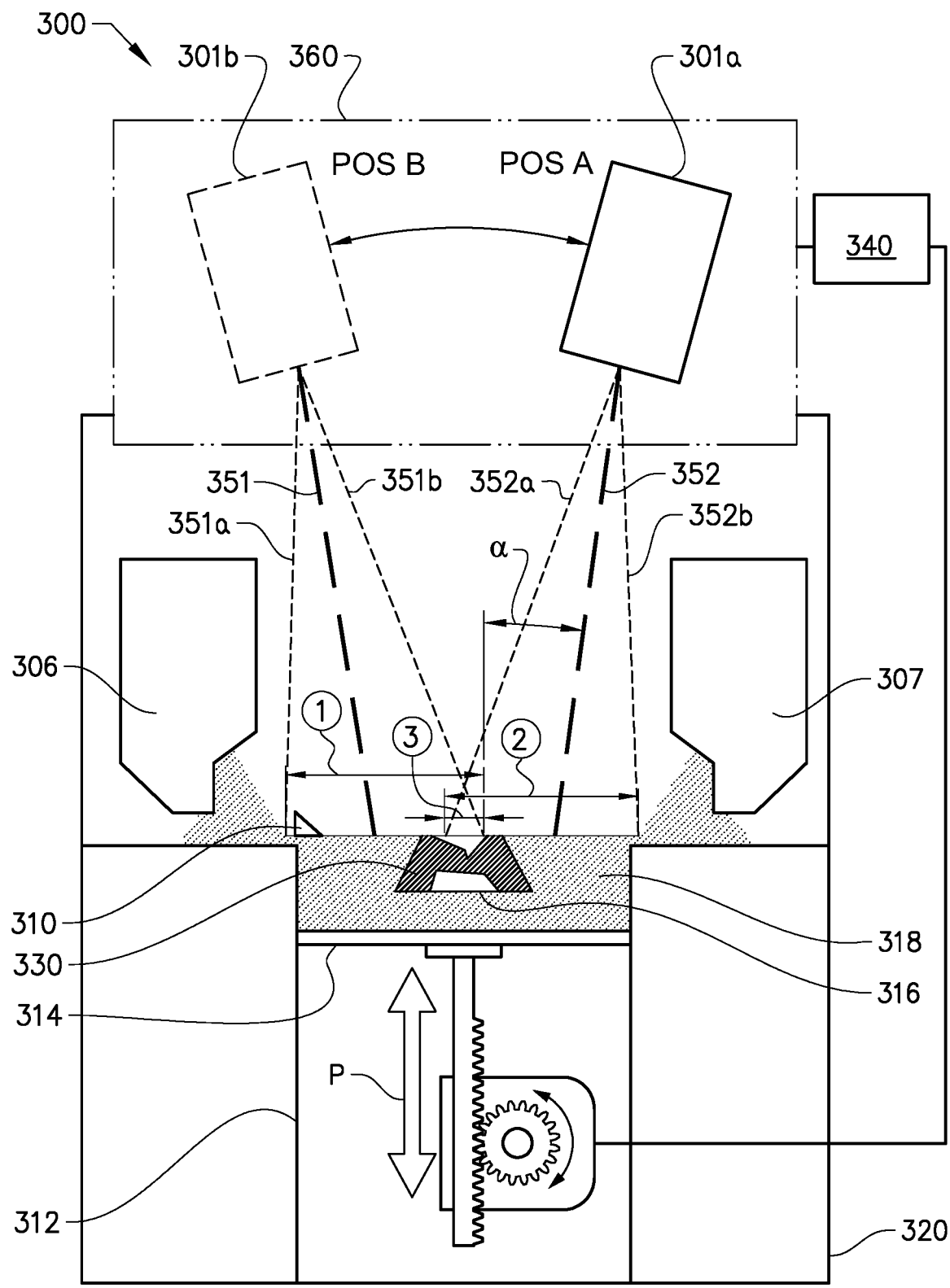
FIG. 3B depicts an apparatus according to a second example embodiment of the present invention.

FIG. 3B illustrates another example embodiment of the present invention. The only difference between the embodiment as depicted in FIG. 3B and FIG. 3A is how the electron beam source is changing its position. In FIG. 3A the electron beam source changed its position by rotating the support 360 a predetermined angle. In FIG. 3B the electron beam source 301 is changing its position by tilting the beam source. The tilting mechanism may be arranged inside the support 360. The tilting may in an example embodiment be accomplished by arranging the electron beam source 301 on a guide rail (not shown) having a suitable form for providing the predetermined position and angle of the electron beam source at its end positions.

Figure 3C:
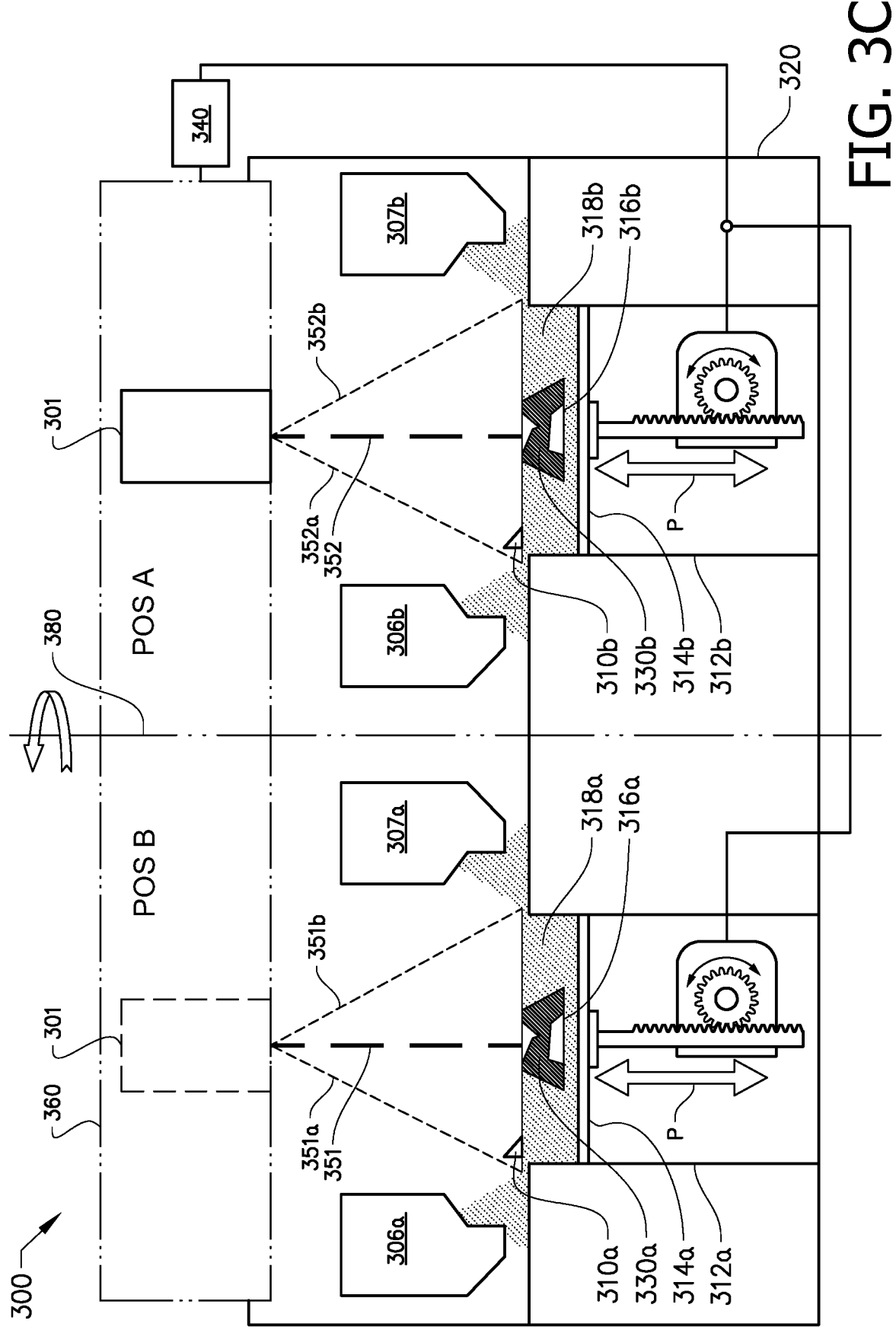
FIG. 3C depicts an apparatus according to a second example embodiment of the present invention.

FIG. 3C illustrates still another example embodiment according to the present invention. Here a first and a second build platform 314*a*, 314*b* respectively is arranged side by side. A single electron beam source 301 is impinging electron beam 351 on the first build platform 314*a* when in position B and the single electron beam source is impinging electron beam 352 on the second build platform 314*b* when in position A. As in FIG. 3A the electron beam source 301 is attached to a support 360 which is rotatable around a rotational axis 380. The rotational axis is in this example embodiment arranged in the middle of the first and the second build platforms 314*a*, 314*b* respectively. A vacuum chamber 320 is enclosing the first and second build platforms 314*a*, 314*b* respectively. The support 360 is attachable to the vacuum chamber 320 and sealable to the same. Three-dimensional articles 330*a* in the first build platform 314*a* may be built in parallel with three-dimensional articles 330*b* in the second build platforms 314*b*. While powder is fused in the first build platform 314*a* a new powder layer may be applied in the second build platform 314*b*. Alternatively the three-dimensional-article 330*a* in the first build platform 314*a* may be finished before the electron beam source is moved from position B to position A for starting manufacturing of the three-dimensional article 330*b* in the second build platform 314*b*.

The powder material in powder hoppers 306*a*, 307*a* may contain a first type of material and the powder material in powder hoppers 306*b*, 307*b* may contain a second type of powder. The first and second types of powder may be of different material or same material with different characteristics for instance a different powder particle distribution may be used in the first build platform compared to the second build platform.

Figure 4A:
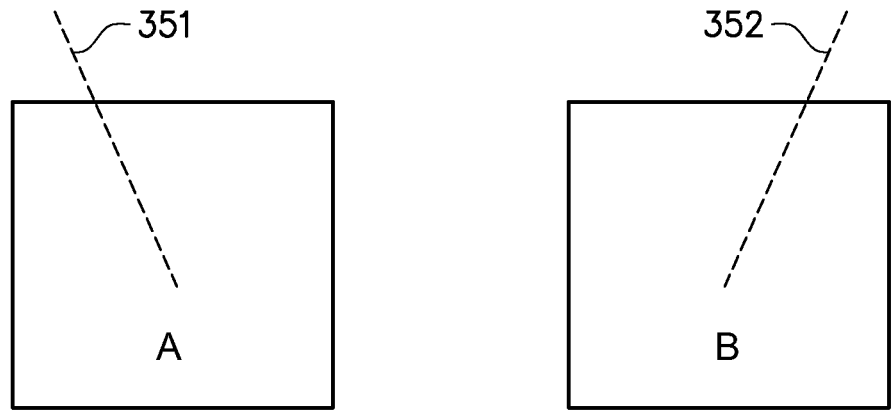
FIG. 4A depicts a top view image of an example embodiment according to the present invention with two build platforms.

In FIG. 4A it is depicted a top view of the build platforms in FIG. 3C. In an alternative embodiment to the one depicted in FIG. 3C in which the electron beam source is rotated for moving the electron beam source from position A to position B, one may tilt the electron beam source in a similar manner is depicted in FIG. 3B.

Figure 4B:
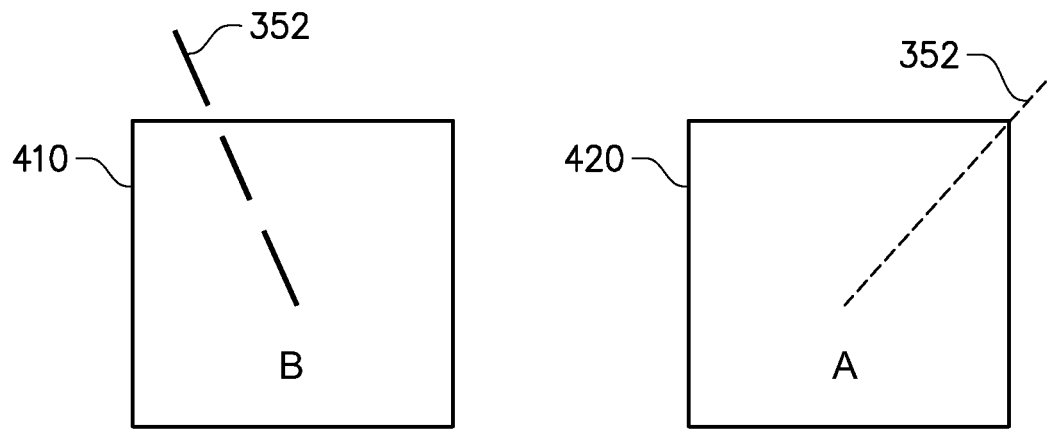
FIG. 4B depicts a top view image of an example embodiment according to the present invention with four build platforms.
Figure 4B:
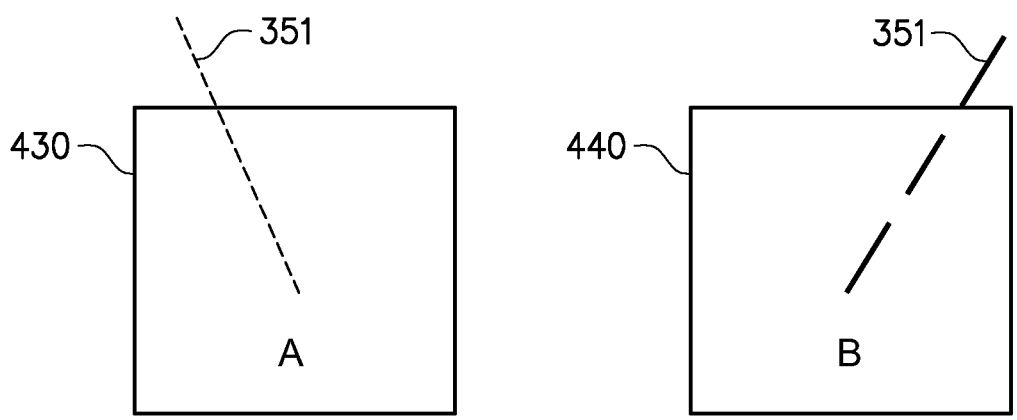

In yet another example embodiment, as depicted in a top view in FIG. 4B, four different build platforms 410, 420, 430, 440 may be used. Here one or two electron beam sources may be used for melting the powder material on the build platforms. In the case of two electron beam sources the sources are arranged opposite to each other denoted A and B in FIG. 4B. Electron beams from a first electron beam source are denoted by 351 and electron beams from a second electron beam source are denoted by 352. While powder material is melted in build platform 410 and 440 a new powder layer may be applied in build platforms 420 and 430. By rotating the support having the first and second electron beam sources attached to it by an angle of 90° so that the first and second electron beam sources are moved from positon A to positon B, the first end second electron beams 351, 352 respectively may start to melt the powder layer in the build platforms denoted 420 and 430 while a new powder layer may be applied in the build platforms denoted by 410 and 440.

Alternatively a single electron beam source is used for melting the powder layers in the four different build platforms 410, 420, 430 and 440 in FIG. 4B. The single electron beam source may start fusing powder material in any one of the four different build platforms. By rotating and/or tilting the electron beam source from a first predetermined position to a second predetermined position the electron beam from the single electron beam source 301 may reach another build platform. As in the other example embodiments described above the single or multiple electron beam sources are all arranged so that a non-deflected electron beam emanating from the electron beam source(s) will impinge on the latest applies powder layer offset to a rotational axis 370, 380 of the support 360 or offset to a central position of the build platform 314*a*, 314*b*.

At least one focusing coil (not shown), at least one deflection coil (not shown) and an electron beam power supply (not shown) may be electrically connected to the control unit 340. In an example embodiment of the invention the electron beam source may generate a focusable electron beam with an accelerating voltage of about 60 kV and with a beam power in the range of 0-10 kW. The pressure in the vacuum chamber may be in the range of $1\times10^{-1}$-$1\times10$ mBar when building the three-dimensional article by fusing the powder layer by layer with the energy beam source 301.

The powder hoppers 306, 307 comprise the powder material to be provided on the start plate 316 in the build tank 312. The powder material may for instance be pure metals or metal alloys such as titanium, titanium alloys, aluminum, aluminum alloys, stainless steel, Co—Cr—W alloy, and the like. Instead of two powder hoppers, one powder hopper may be used. Other designs and/or mechanism for of the powder supply may be used, for instance a powder tank with a height-adjustable floor.

The powder distributor 310 is arranged to lay down a thin layer of the powder material on the start plate 316. During a work cycle the build platform 314 will be lowered successively in relation to the ray gun after each added layer of powder material. In order to make this movement possible, the build platform 314 is in one embodiment of the invention arranged movably in vertical direction, i.e., in the direction indicated by arrow P. This means that the build platform 314 starts in an initial position, in which a first powder material layer of necessary thickness has been laid down on the start plate 316. The build platform is thereafter lowered in connection with laying down a new powder material layer for the formation of a new cross section of a three-dimensional article. Means for lowering the build platform 314 may for instance be through a servo engine equipped with a gear, adjusting screws, and the like.

Figure 5:
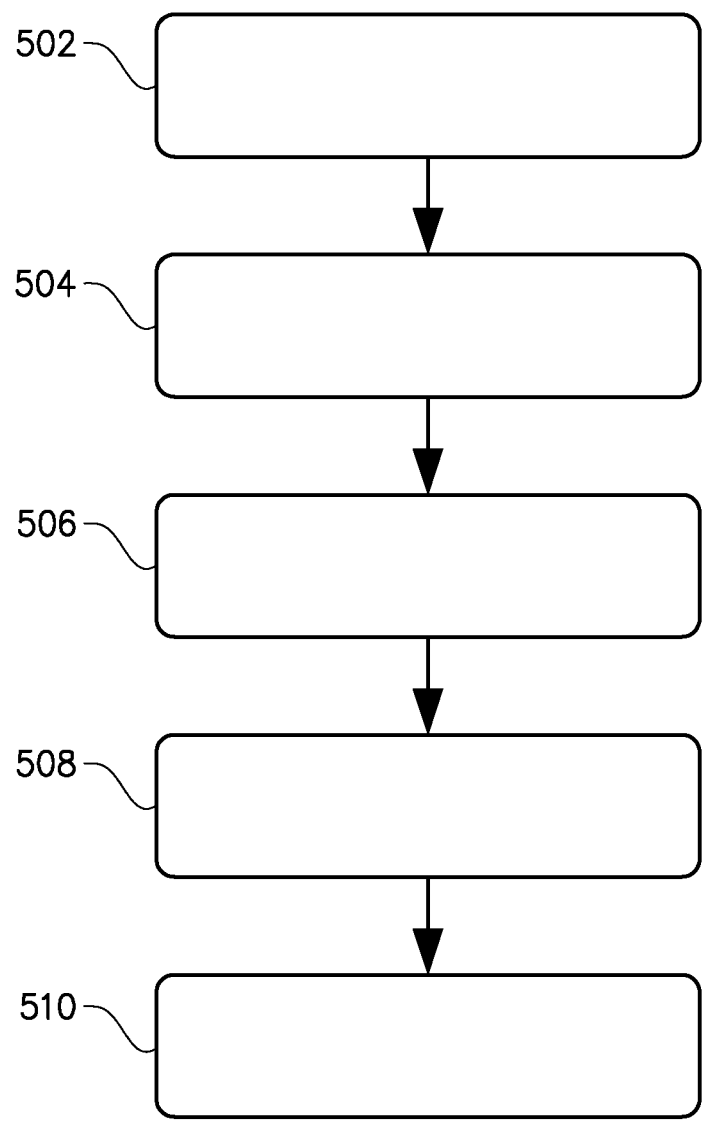
FIG. 5 depicts a flow chart of the method according to an example embodiment of the present invention.

In FIG. 5 it is depicted a flow chart of an example embodiment of a method according to the present invention for forming a three-dimensional article through successive fusion of parts of a powder bed, which parts corresponds to successive cross sections of the three-dimensional article, comprising a first step 502 of providing a model of the three dimensional article. The model may be a computer model generated via a CAD (Computer Aided Design) tool.

In a second step 504 a first powder layer is provided on the start plate 316 or build platform 314. The powder may be distributed evenly over the build platform according to several methods. One way to distribute the powder is to collect material fallen down from the hopper 306, 307 by a rake system. The rake 310 is moved over the build tank thereby distributing the powder over the start plate. The distance between a lower part of the rake and the upper part of the start plate or previous powder layer determines the thickness of powder distributed over the start plate. The powder layer thickness can easily be adjusted by adjusting the height of the build platform 314. Instead of starting to build the three-dimensional article on the start plate 316 the three-dimensional article may be built on the build platform 314 which may be removable. In yet another exemplary embodiment, the three-dimensional article may be started to be built on a powder bed.

In a third step 506 an electron beam from an electron beam source is directed over the at least one build platform where a central non-deflected electron beam emanating from the electron beam source is provided off-centre on the build platform, the directing of the electron beam 351 causing the first powder layer to fuse in a first selected locations according to the model, so as to form a first part of a first cross section of the three-dimensional article.

The electron beam 351 may be directed over the build platform 314 from instructions given by a control unit 340. In the control unit 340 instructions for how to control the beam source 301 for each layer of the three-dimensional article may be stored.

In a fourth step 508 the electron beam source is rotated or tilted a predetermined angle.

After having rotated or tilted the electron beam source a predetermined angle, electron beams emanating from the electron beam source may start to reach a different predetermined area which may be a different build platform compared to where electron beams impinged in the previous position of the electron beam source.

In a fifth step 510 the electron beam is directed from the tilted or rotated electron beam source over the at least one build platform, the directing of the electron beam causing a first powder layer to fuse in a second selected locations according to the model, so as to form a second part of a first cross section of a three-dimensional article, wherein the first and second selected locations are provided on a first and second build platform respectively.

Alternatively as to the described embodiment above the electron beam source in the first and second position may emanate electron beams impinging on one and the same build platform 314. The first and second selected locations 1, 2 of the first powder layer may be at least partially overlapping each other in the overlap region 3. The first selected locations 1 of the first powder layer is fused with the energy beam source 301 in position B, and the second selected locations 2 of the first power layer is fused with the energy beam source 301 in position A. In order to make sure that the fusion is completed over a full first cross section of the three-dimensional article, the first selected locations 1 and second selected locations 2 may be at least partially overlapping each other. This means that the same area (overlap region) of the first cross section of the three dimensional article may be fused twice, once with the energy beam source in position A and once with the energy beam source in position B.

Instead of rotating or tilting the electron beam source for increasing the area onto which an electron beam from the electron beam source may reach, the electron beam source may be moved laterally in a plane in parallel with the build platform 314. The movement may for instance be a slidable movement on a fixed guide rail onto which a support is arranged and to which the electron beam source is placed.

Figure 1:
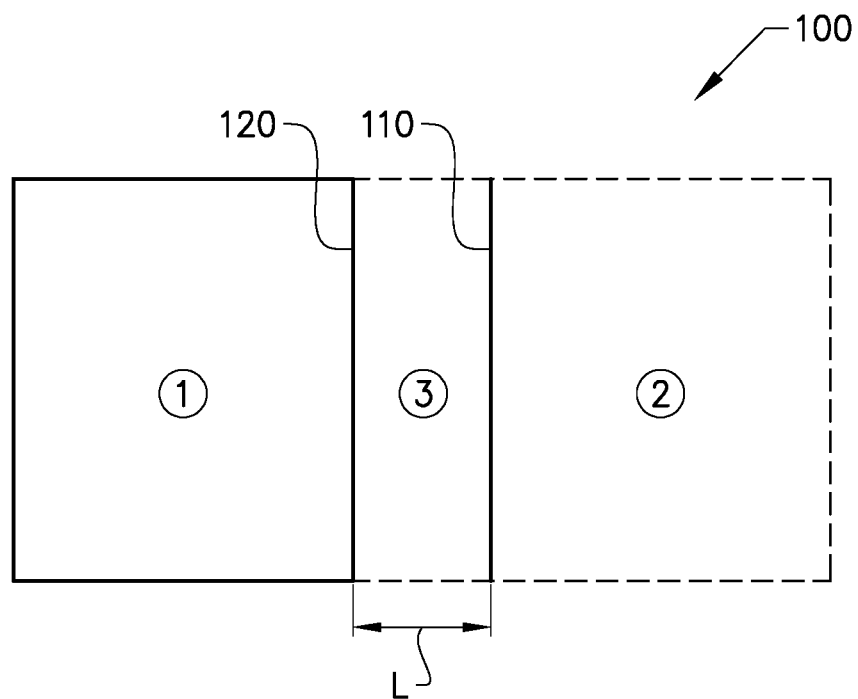
FIG. 1 depicts a top view image of a first fused powder layer.

FIG. 1 illustrates a top view of a build platform or a start plate or a powder bed 100. The electron beam source in position A may reach a first selected locations denoted by 1. The electron beam source in position B may reach a second selected locations denoted by 2. The first and second selected locations may be overlapping each other defining an overlapping zone denoted by 3. A length of the overlapping zone is denoted by L. The first selected locations 1 may be ending at a first line 110 and the second selected locations may be ending at a second line 120. The second line 120 is provided inside the first selected locations 1 which can be fused by the electron beam source in position A, and the first line 110 is provided inside the second selected locations 2 which can be fused by the electron beam source in position B.

The overlapping zone 3 fused by the first beam 351 may be refused by the second beam 352 after the first beam has left the passage, i.e., the first and second beams are not simultaneously at the very same position at any time.

After a first layer is finished, i.e., the fusion of powder material for making a first layer of the three-dimensional article, a second powder layer is provided on the build platform 316. The second powder layer may be in certain embodiments distributed according to the same manner as the previous layer. However, there might be other methods in the same additive manufacturing machine for distributing powder onto the build platform. For instance, a first layer may be provided by means of a first powder distributor, a second layer may be provided by another powder distributor. The design of the powder distributor is automatically changed according to instructions from the control unit. A powder distributor in the form of a single rake system, i.e., where one rake is catching powder fallen down from both a left powder hopper 306 and a right powder hopper 307, the rake as such can change design.

After having distributed the second powder layer on the build platform 316, the first energy beam 351 from the electron beam source 301 in position A may be directed over the build platform 316 causing the second powder layer to fuse in a third selected locations according to the model to form a second cross section of the three-dimensional article.

Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

The second energy beam 352 from the electron beam source 301 in position B may be directed over the build platform 316 causing the second powder layer to fuse in a fourth selected locations according to the model to form the second cross section of the three-dimensional article, the third and fourth selected locations of the second powder layer may be at least partially overlapping each other, where the at least partially overlapping third and fourth locations may be laterally shifted with respect to the at least partially overlapping first and second locations 1, 2. The overlapping zone 3 in the second layer may be shifted laterally with respect to the overlapping zone 3 in the first layer. The shift may be as large as the overlapping zones in consecutive layers are not overlapping each other. The shift may be within a predetermined range so that the overlap zones are still overlapping each other. The length L of the overlapping zone may vary from one layer to another.

Figure 2:
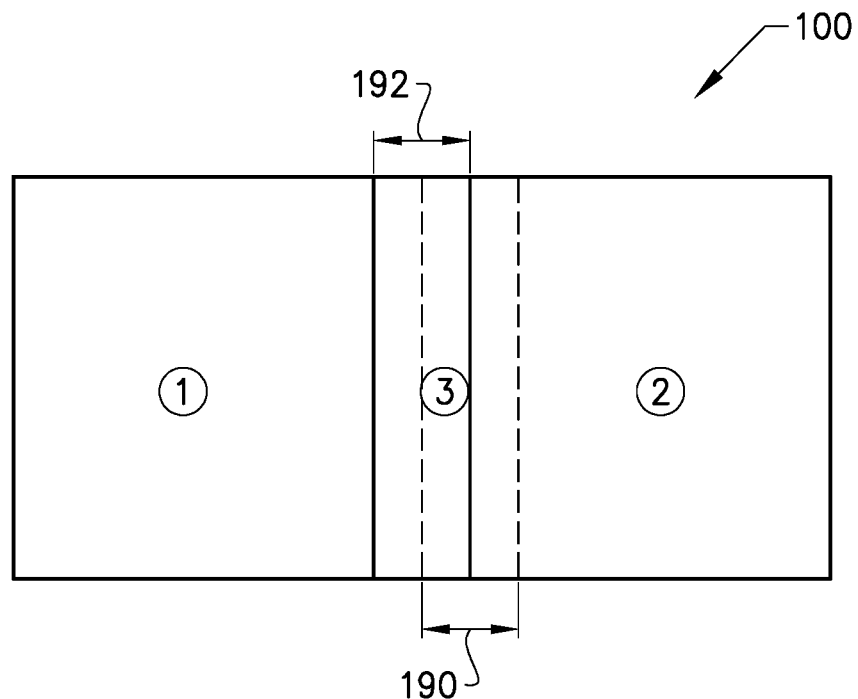
FIG. 2 depicts a top view of a second example embodiment according to the present invention of a first and second fused powder layer.

In still another example embodiment, illustrated in FIG. 2, according to the present invention a width 190, 192 of the overlapping zone may be equal in the first and second layer. In other embodiments, the length 190, 192 of the overlapping zone may be different in the first layer compared to the second layer. In still another example embodiment the length of the overlapping zone is randomized between a predetermined minimum value and maximum value for at least one layer.

In another aspect of the invention it is provided a program element configured and arranged when executed on a computer to implement a method as detailed herein. The program element may be installed in a non-transitory computer readable storage medium. The computer readable storage medium may be on the control unit 340 or on another control unit. The computer readable storage medium and the program element, which may comprise computer-readable program code portions embodied therein, may further be contained within a non-transitory computer program product. Further details in this regard are provided below.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magneto-resistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 6:
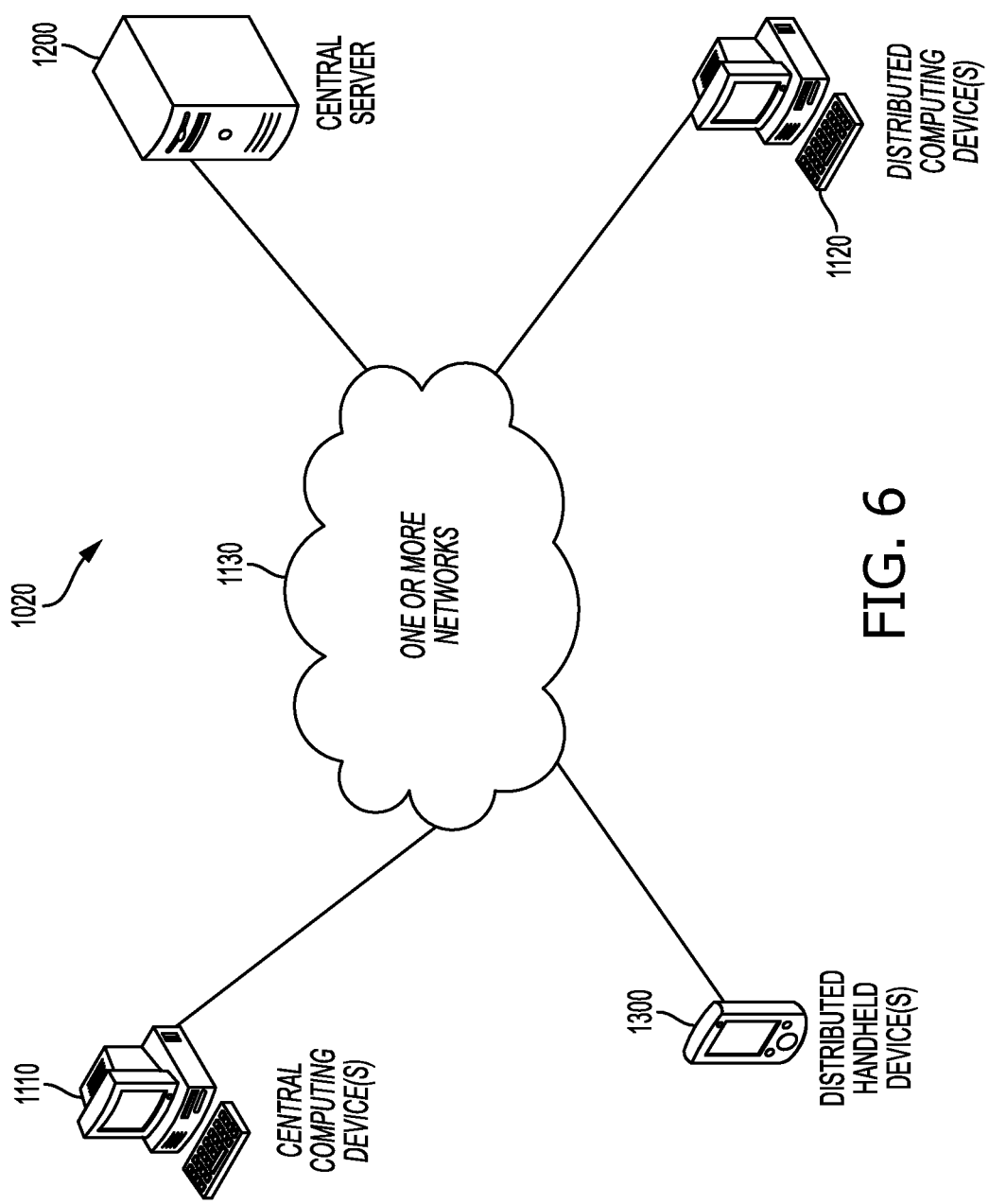
FIG. 6 is a block diagram of an exemplary system 1020 according to various embodiments.

FIG. 6 is a block diagram of an exemplary system 1020 that can be used in conjunction with various embodiments of the present invention. In at least the illustrated embodiment, the system 1020 may include one or more central computing devices 1110, one or more distributed computing devices 1120, and one or more distributed handheld or mobile devices 1300, all configured in communication with a central server 1200 (or control unit) via one or more networks 1130. While FIG. 6 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 1130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 1130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 1020 may be configured to communicate with one another in accordance with techniques such as, for example, radio frequency (RF), Bluetooth™ infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-1300 are illustrated in FIG. 6 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 7A:
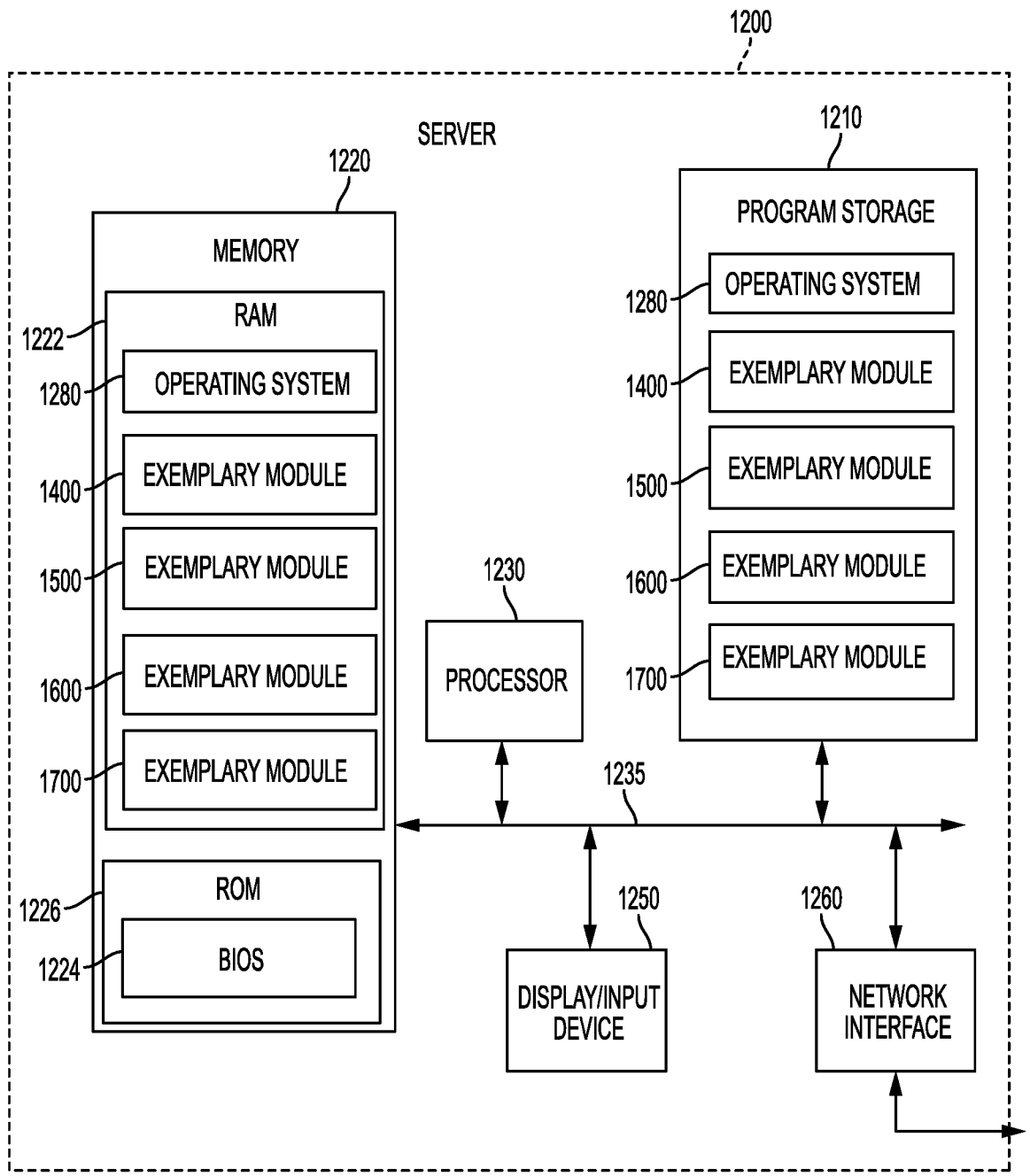
FIG. 7A is a schematic block diagram of a server 1200 according to various embodiments.

FIG. 7A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which preferably includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1020. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1060 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 7B:
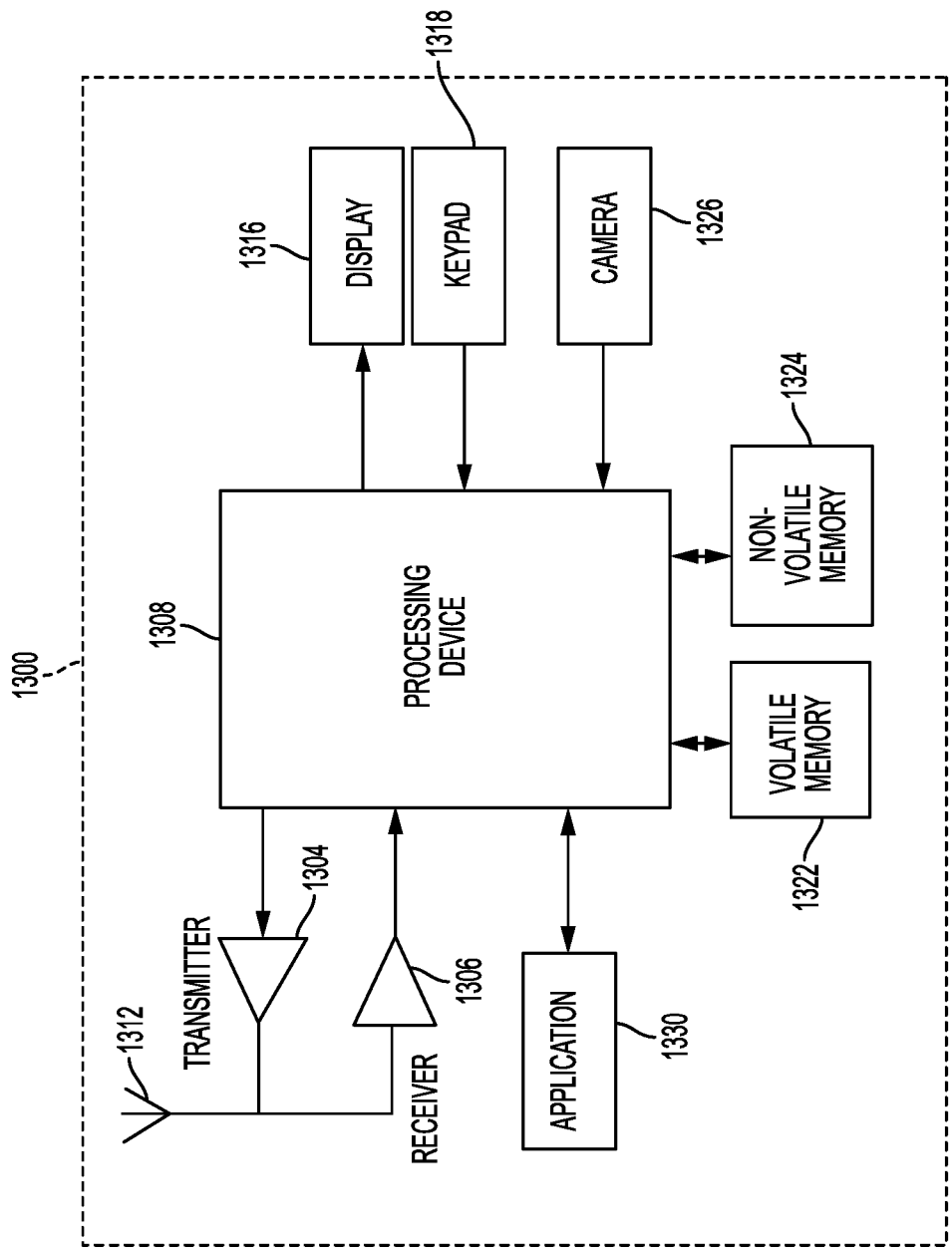
FIG. 7B is a schematic block diagram of an exemplary mobile device 1300 according to various embodiments.

FIG. 7B provides an illustrative schematic representative of a mobile device 1300 that can be used in conjunction with various embodiments of the present invention. Mobile devices 1300 can be operated by various parties. As shown in FIG. 7B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MIMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 1308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIIM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1020 as a whole.

It should be understood that the present invention is not limited to the above-described embodiments and many modifications are possible within the scope of the following claims. Such modifications may, for example, involve using a different source of energy beam than the exemplified electron beam such as a laser beam. Additionally or otherwise, materials other than metallic powder may be used, such as the non-limiting examples of powder of polymers or powder of ceramics.

What is claimed:

1. A method for increasing the build area when forming at least one three-dimensional article through successive fusion of parts of a powder bed, which parts correspond to successive cross sections of the at least one three-dimensional article, the method comprising the steps of:
   providing a model of the at least one three dimensional article;
   applying a first powder layer on a first build platform and on a second build platform;
   directing a deflectable electron beam from an electron beam source arranged in a first position over the first build platform, the directing of the electron beam causing the first powder layer to fuse in a first selected locations on the first build platform according to the model, so as to form a first part of a first cross section of the at least one three-dimensional article;
   at least one of rotating or tilting the electron beam source a predetermined angle to a second position over the second build platform; and
   directing the deflectable electron beam from the electron beam source in the second position over the second build platform, the directing of the electron beam causing the first powder layer to fuse in a second selected locations on the second build platform according to the model, so as to form a second part of the first cross section of the at least one three-dimensional article.

2. The method according to claim 1, wherein a central non-deflected electron beam emanating from the electron beam source is building an angle α with respect to a normal to the build platform≠0°.

3. The method according to claim 1, wherein the first part of the first cross section of the at least one three-dimensional article on the first build platform is finished before forming the second part of the first cross section of the at least one three-dimensional article on the second build platform.

4. The method according to claim 1, wherein the first part of the first cross section of the at least one three-dimensional article on the first build platform is formed in parallel with the second part of the first cross section of the at least one three-dimensional article on the second build platform.

5. The method according to claim 1, wherein a central non-deflected electron beam emanating from the electron beam source is provided off-centre on the first build platform or the second build platform.

6. The method according to claim 1, wherein the predetermined rotating angle is 90° or 180°.

7. The method according to claim 1, wherein the predetermined tilting angle is between 5-45°.

8. The method according to claim 1, further comprising the steps of:
   applying a second powder layer on top of the partially fused first powder layer on the first build platform and on the second build platform;
   directing the deflectable electron beam from the electron beam source arranged in a third position over the first build platform causing the second powder layer to fuse in a third selected locations on the first build platform according to the model to form a first part of a second cross section of the at least one three-dimensional article;
   rotating or tilting the electron beam source a predetermined angle to a fourth position over the second build platform; and
   directing the deflectable electron beam from the electron beam source in the fourth position over the second build platform, the directing of the electron beam causing the second powder layer to fuse in a fourth selected locations on the second build platform according to the model, so as to form a second part of the second cross section of the at least one three-dimensional article,
   wherein the first and second selected locations of the first cross section is at least partially refused when fusing the third and fourth selected locations respectively.

9. The method according to claim 1, wherein:
   the model of the at least one three dimensional article is retrieved from one or more memory storage areas; and
   at least one of the applying, directing, or rotating steps are executed via at least one computer processor.

10. A computer-implemented method for increasing the build area when forming at least one three-dimensional article through successive fusion of parts of a powder bed, which parts correspond to successive cross sections of the at least one three-dimensional article, the method comprising the steps of:
    providing in one or more memory storage areas a model of the at least one three dimensional article; and
    via one or more computer processors:

applying a first powder layer on a first build platform and on a second build platform;

directing a deflectable electron beam from an electron beam source arranged in a first position over the first build platform, the directing of the electron beam causing the first powder layer to fuse in a first selected locations on the first build platform according to the model, so as to form a first part of a first cross section of the at least one three-dimensional article;

at least one of rotating or tilting the electron beam source a predetermined angle to a second position over the second build platform; and directing the deflectable electron beam from the electron beam source in the second position over the second build platform, the directing of the electron beam causing the first powder layer to fuse in a second selected locations on the second build platform according to the model, so as to form a second part of the first cross section of the at least one three-dimensional article.

11. An apparatus for forming at least one three-dimensional article through successive fusion of parts of a powder bed, which parts corresponds to successive cross sections of the at least one three-dimensional article, the apparatus comprising:

a computer model of the at least one three-dimensional article;

means for applying a first powder layer on a first build platform and on a second build platform;

an electron beam source emitting a deflectable electron beam causing a first powder layer to fuse in first selected locations on a first build platform according to the model to form a first part of a first cross section of the at least one three-dimensional article;

at least one of a rotating support or a tiltable support to which the electron beam source is attached; and at least one control unit configured for controlling at least one of a rotation angle or a tilting angle of the support and for storing the computer model and controlling the electron beam source, wherein the electron beam source is configured to be at least one of rotated, tilted or moved between a first and second position so that when the electron beam source is arranged in the first position the electron beam is forming three-dimensional articles on the first build platform and when the electron beam source is arranged in the second position the electron beam is forming three-dimensional articles on the second build platform.

12. An apparatus for forming at least one three-dimensional article through successive fusion of parts of a powder bed, which parts corresponds to successive cross sections of the at least one three-dimensional article, the apparatus comprising:

one or more memory storage areas containing a computer model of the at least one three-dimensional article;

means for applying a first powder layer on a first build platform and on a second build platform;

an electron beam source emitting a deflectable electron beam causing a first powder layer to fuse in first selected locations on the first build platform according to the model to form a first part of a first cross section of the at least one three-dimensional article;

at least one of a rotating support or a tiltable support to which the electron beam source is attached; and at least one control unit configured for, via one or more computer processors, controlling at least one of a rotation angle or a tilting angle of the support and for storing the computer model and controlling the electron beam source, wherein the electron beam source is configured to be at least one of rotated or tilted between a first and second position so that when the electron beam source is arranged in the first position the electron beam is forming three-dimensional articles on the first build platform and when the electron beam source is arranged in the second position the electron beam is forming three-dimensional articles on the second build platform.

13. A computer program product comprising at least one non-transitory computer-readable storage medium having computer-readable program code portions embodied therein, the computer-readable program code portions comprising at least one executable portion configured for:

directing a deflectable electron beam from an electron beam source arranged in a first position over a first build platform, the directing of the electron beam causing a first powder layer applied to the first platform to fuse in a first selected locations according to a model of the at least one three dimensional article, so as to form a first part of a first cross section of the three-dimensional article;

at least one of rotating or tilting the electron beam source a predetermined angle to a second position over a second build platform; and directing the deflectable electron beam from the electron beam source in the second position over the second build platform, the directing of the electron beam causing a first powder layer to fuse in a second selected locations on the second build platform according to the model, so as to form a second part of the first cross section of the at least one three-dimensional article.

14. The computer program product according to claim 13, wherein the electron beam source is configured to be at least one of rotated or tilted between a first and second position so that when the electron beam source is arranged in the first position the electron beam is forming three-dimensional articles on the first build platform and when the electron beam source is arranged in the second position the electron beam is forming three-dimensional articles on the second build platform.

* * * * *